US011066540B2

(12) United States Patent
Tanimoto

(10) Patent No.: US 11,066,540 B2
(45) Date of Patent: Jul. 20, 2021

(54) RUBBER CRAWLER

(71) Applicant: BRIDGESTONE CORPORATION, Tokyo (JP)

(72) Inventor: Yoshikazu Tanimoto, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 313 days.

(21) Appl. No.: 16/369,938

(22) Filed: Mar. 29, 2019

(65) Prior Publication Data

US 2019/0225779 A1    Jul. 25, 2019

Related U.S. Application Data

(63) Continuation of application No. PCT/JP2017/033512, filed on Sep. 15, 2017.

(30) Foreign Application Priority Data

Sep. 30, 2016   (JP) ............................. JP2016-192839

(51) Int. Cl.
| | |
|---|---|
| C08L 9/06 | (2006.01) |
| C08L 7/00 | (2006.01) |
| C08C 19/00 | (2006.01) |
| B62D 55/24 | (2006.01) |
| B62D 55/253 | (2006.01) |
| B32B 25/00 | (2006.01) |
| C09C 1/48 | (2006.01) |
| C08K 3/04 | (2006.01) |

(52) U.S. Cl.
CPC ............. *C08L 9/06* (2013.01); *B32B 25/00* (2013.01); *B62D 55/24* (2013.01); *B62D 55/244* (2013.01); *B62D 55/253* (2013.01); *C08C 19/00* (2013.01); *C08K 3/04* (2013.01); *C08L 7/00* (2013.01); *C09C 1/48* (2013.01); *C08L 2205/025* (2013.01); *C08L 2205/03* (2013.01); *C08L 2312/02* (2013.01)

(58) Field of Classification Search
CPC .......... C08L 9/06; C08L 7/00; C08L 2312/02; C08L 2205/03; B62D 55/24; C09C 1/48; C09K 3/04
USPC ........................................................ 524/230
See application file for complete search history.

(56) References Cited

U.S. PATENT DOCUMENTS

| | | | |
|---|---|---|---|
| 8,530,549 B2* | 9/2013 | Tanimoto ............. | C07D 277/78 524/84 |
| 2007/0126286 A1 | 6/2007 | Feldmann et al. | |
| 2009/0256418 A1 | 10/2009 | Uchida | |
| 2010/0096915 A1 | 4/2010 | Hagio | |
| 2015/0001047 A1 | 1/2015 | Nakano | |
| 2015/0005433 A1 | 1/2015 | Furuhata | |
| 2015/0048672 A1* | 2/2015 | Okada ................... | B62D 55/24 305/165 |
| 2015/0050506 A1* | 2/2015 | Musha .................... | B60C 1/00 428/457 |

FOREIGN PATENT DOCUMENTS

| | | |
|---|---|---|
| AU | 6558701 A1 | 4/2002 |
| CN | 2119372 U | 10/1992 |
| CN | 1974299 A | 6/2007 |
| CN | 101312872 A | 11/2008 |
| CN | 101605690 A | 12/2009 |
| CN | 104114631 A | 10/2014 |
| CN | 104159957 A | 11/2014 |
| CN | 105324430 A | 2/2016 |
| EP | 3012291 A1 | 4/2016 |
| JP | 11-199710 A | 7/1999 |
| JP | 11-227644 A | 8/1999 |
| JP | 2007-22304 A | 2/2007 |
| JP | 2009-298905 A | 12/2009 |
| JP | 2010-254166 A | 11/2010 |
| JP | 2015-218273 A | 12/2015 |

OTHER PUBLICATIONS

Communication dated Jan. 22, 2021 from The State Intellectual Property Office of the P.R. of China in Application No. 201780060399.4.
Wang Ke-Cheng et al, China Rubber, China Academic Journal Electronic Publishing House, Nov. 30, 2011, vol. 27, No. 22, pp. 34-38, 5 pages.
International Search Report for PCT/JP2017/033512 dated Nov. 28, 2017 (PCT/ISA/210).

* cited by examiner

*Primary Examiner* — Doris L Lee
(74) *Attorney, Agent, or Firm* — Sughrue Mion, PLLC

(57) ABSTRACT

Provided is a rubber crawler including a guide rubber that is reduced in heat generation and excellent in abrasion resistance and an inner peripheral rubber that is excellent in scratch resistance and abrasion resistance and having excellent adhesiveness between the guide rubber and the inner peripheral rubber.
The rubber crawler of the present invention includes a guide rubber obtained by crosslinking a guide rubber composition and an inner peripheral rubber obtained by crosslinking an inner peripheral rubber composition, the guide rubber composition containing a rubber component (A) and a carbon black (B), the rubber component (A) containing a butadiene rubber and at least one selected from a natural rubber and isoprene rubber, and containing 50 to 80% by mass of the natural rubber and the isoprene rubber and 20 to 50% by mass of the butadiene rubber, the carbon black (B) containing a carbon black (B-1) having an $N_2SA$ of 60 to 125 $m^2/g$ and a DBP absorption of less than 130 mL/100 g and a carbon black (B-2) having an $N_2SA$ of less than 60 $m^2/g$ and a DBP absorption of 110 mL/100 g or more, and a total content of the carbon black (B-1) and the carbon black (B-2) is 25 to 65 parts by mass based on 100 parts by mass of the rubber component; the inner peripheral rubber composition containing a rubber component (a) and a carbon black (b), the rubber component (a) containing 60 to 100% by mass of SBR and 0 to 40% by mass of a diene-based rubber other than the styrene-butadiene rubber, and a carbon black in an amount of 50 to 70 parts by mass based on 100 parts by mass of the rubber component.

20 Claims, 1 Drawing Sheet

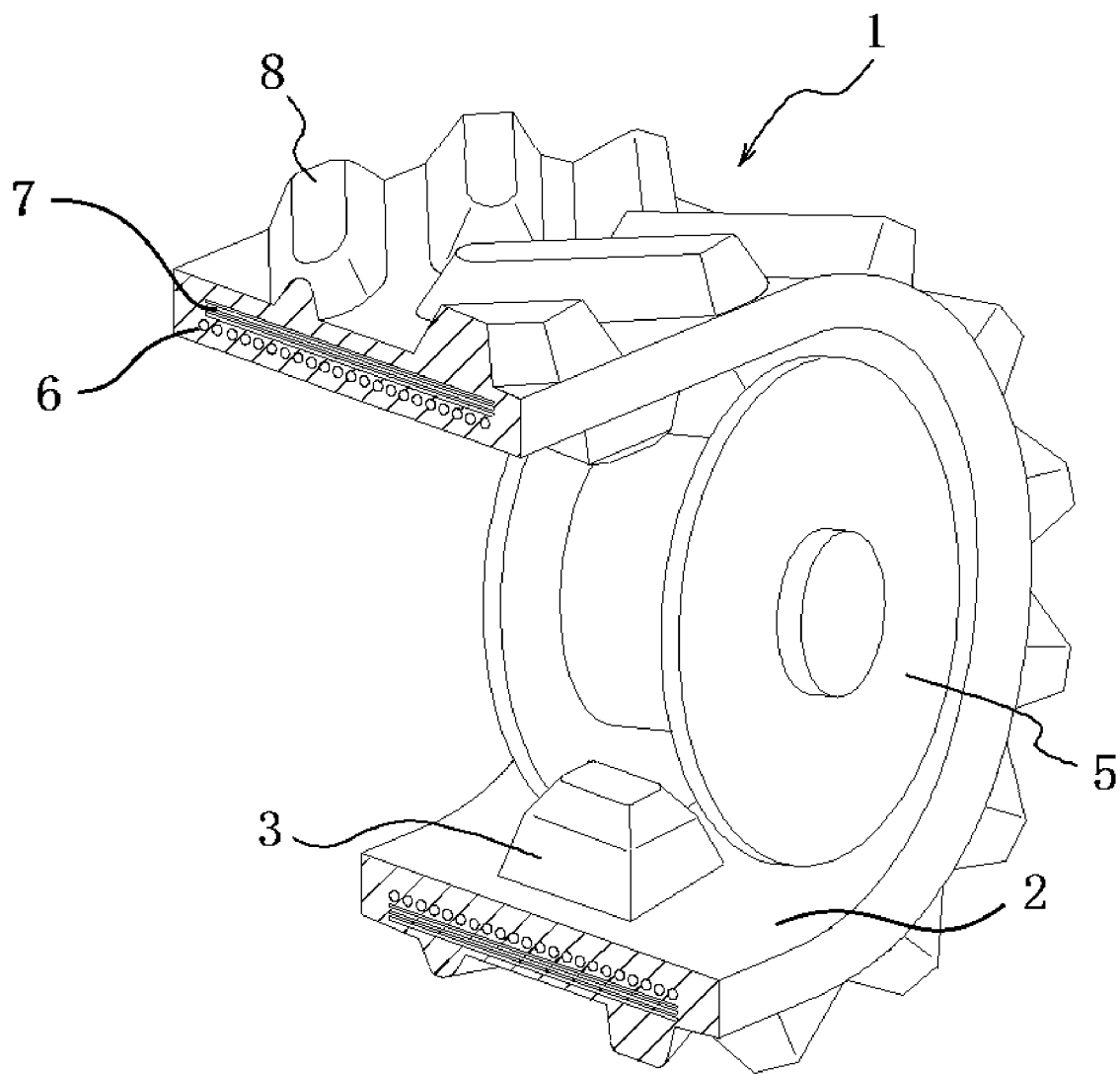

RUBBER CRAWLER

TECHNICAL FIELD

The present invention relates to a rubber crawler.

BACKGROUND ART

An inner peripheral structure of a coreless rubber crawler is composed of a guide rubber located in the center of the crawler width direction and preventing wheel run-off between the guide rubber and a drive wheel of a machine body and an inner peripheral rubber supporting the guide rubber.

For the purpose of obtaining a rubber crawler that is excellent in not only abrasion resistance, crack resistance, and resistance to ozone degradation but also cut resistance, PTL 1 discloses a rubber crawler containing 5 to 40% by mass of a butadiene-based polymer (A) in which a molecular weight distribution (Mw/Mn) is from 1.6 to 3.5, and in a 1,3-butadiene monomer unit, the content of a cis-1,4 bond is 98% or more, and the content of a vinyl bond is 0.3% or less, as measured by the Fourier transform infrared spectroscopy; and 95 to 60% by mass of a diene-based rubber (B).

CITATION LIST

Patent Literature

PTL 1; JP-A 2009-298905

SUMMARY OF INVENTION

Technical Problem

It was found that there is a case where if a guide rubber using the rubber composition as described in PTL 1 is fabricated, in view of the matter that the drive wheel of a machine body and the guide rubber come into contact with each other to generate heat due to deformation, its life as a rubber crawler is conspicuously impaired.

An object of the present invention is to provide a rubber crawler having a guide rubber that is reduced in heat generation to be caused due to contact and abrasion between a drive wheel of a machine body and a rolling wheel and that is excellent in abrasion resistance, and an inner peripheral rubber that is excellent in scratch resistance and abrasion resistance; and having excellent adhesiveness between the guide rubber and the inner peripheral rubber.

Solution to Problem

As a result of extensive and intensive investigations made by the present inventors, it has been found that the aforementioned object may be achieved by a rubber crawler including a guide rubber obtained by crosslinking a specified guide rubber composition and an inner peripheral rubber obtained by crosslinking a specified inner peripheral rubber composition.

Specifically, the present invention is concerned with the following <1> to <8>.
<1> A rubber crawler including a guide rubber obtained by crosslinking a guide rubber composition and an inner peripheral rubber obtained by crosslinking an inner peripheral rubber composition, the guide rubber composition containing a rubber component (A) and a carbon black (B), the rubber component (A) containing a butadiene rubber and at least one selected form a natural rubber and a isoprene rubber, and containing 50 to 80% by mass in total of the natural rubber and the isoprene rubber and 20 to 50% by mass of the butadiene rubber, the carbon black (B) containing a carbon black (B-1) having a nitrogen adsorption specific surface area of 60 to 125 $m^2/g$ and a dibutyl phthalate absorption of less than 130 mL/100 g and a carbon black (B-2) having a nitrogen adsorption specific surface area of less than 60 $m^2/g$ and a dibutyl phthalate absorption of 110 mL/100 g or more, and a total content of the carbon black (B-1) and the carbon black (B-2) is 25 to 65 parts by mass based on 100 parts by mass of the rubber component (A); and the inner peripheral rubber composition containing a rubber component (a) and a carbon black (b), the rubber component (a) containing 60 to 100% by mass of a styrene-butadiene rubber and 0 to 40% by mass of a diene-based rubber other than the styrene-butadiene rubber, and a content of the carbon black (b) is 50 to 70 parts by mass based on 100 parts by mass of the rubber component (a).
<2> The rubber crawler as set forth in <1>, wherein the carbon black (b) is a carbon black having a nitrogen adsorption specific surface area of 40 to 125 $m^2/g$ and a dibutyl phthalate absorption of 95 mL/100 g or more.
<3> The rubber crawler as set forth in <1> or <2>, wherein the guide rubber composition further contains a fatty acid amide (C) in an amount of 0.5 to 10 parts by mass based on 100 parts by mass of the rubber component (A).
<4> The rubber crawler as set forth in any one of <1> to <3>, wherein the rubber component (a) contains 5 to 40 mass % of the diene-based rubber other than the styrene-butadiene rubber.
<5> The rubber crawler as set forth in <4>, wherein the diene-based rubber other than the styrene-butadiene rubber is at least one selected from the group consisting of a natural rubber, an isoprene rubber, a butadiene rubber, and an acrylonitrile butadiene rubber.
<6> The rubber crawler as set forth in any one of <1> to <5>, wherein a mass ratio ((B-1)/(B-2)) of the content of the carbon black (B-1) to the content of the carbon black (B-2) is from 2/1 to ¼.
<7> The rubber crawler as set forth in any one of <1> to <6>, which is a coreless rubber crawler.
<8> The rubber crawler as set forth in any one of <1> to <7>, which is of a friction drive type.

Advantageous Effects of Invention

In accordance with the present invention, it is possible to provide a rubber crawler having a guide rubber that is reduced in heat generation to be caused due to contact and friction between a drive wheel of a machine body and a rolling wheel and excellent in abrasion resistance and an inner peripheral rubber that is excellent in scratch resistance and abrasion resistance and having excellent adhesiveness between the guide rubber and the inner peripheral rubber.

BRIEF DESCRIPTION OF DRAWING

FIG. 1 is a cross-sectional perspective view illustrating an embodiment of a drive section between the rubber crawler of the present invention and a drive wheel of a machine body.

DESCRIPTION OF EMBODIMENTS

The present invention is hereunder exemplified and described in detail based on an embodiment thereof. In the following description, a description of "A to B" showing a numerical value range expresses a numerical value range including A and B as endpoints, and in the case of A<B, it expresses "A or more and B or less", whereas in the case of A>B, it expresses "A or less and B or more".

In addition, the terms "part by mass" and "% by mass" are synonymous with "part by weight" and "% by weight", respectively.

The rubber crawler of the present invention includes a guide rubber obtained by crosslinking a guide rubber composition and an inner peripheral rubber obtained by crosslinking an inner peripheral rubber composition, the guide rubber composition containing a rubber component (A) and a carbon black (B), the rubber component (A) containing a butadiene rubber and at least one selected from a natural rubber and isoprene rubber, and containing 50 to 80% by mass in total of the natural rubber and the isoprene rubber and 20 to 50% by mass of the butadiene rubber, the carbon black (B) containing a carbon black (B-1) having a nitrogen adsorption specific surface area ($N_2SA$) of 60 to 125 $m^2/g$ and a dibutyl phthalate (DBP) absorption of less than 130 mL/100 g and a carbon black (B-2) having a nitrogen adsorption specific surface area ($N_2SA$) of less than 60 $m^2/g$ and a dibutyl phthalate (DBP) absorption of 110 mL/100 g or more, and a total content of the carbon black (B-1) and the carbon black (B-2) is 25 to 65 parts by mass based on 100 parts by mass of the rubber component (A); and the inner peripheral rubber composition containing a rubber component (a) and a carbon black (b), the rubber component (a) containing 60 to 100% by mass of a styrene-butadiene rubber and 0 to 40% by mass of a diene-based rubber other than the styrene-butadiene rubber, and a content of the carbon black (b) is 50 to 70 parts by mass based on 100 parts by mass of the rubber component (a).

The rubber crawler of the present invention is preferably a coreless rubber crawler, and also preferably a rubber crawler of a friction drive type.

The rubber crawler of the present invention includes a guide rubber located in the center of the width direction of the rubber crawler and preventing wheel run-off between the guide rubber and a drive wheel of a machine body and an inner peripheral rubber supporting the guide rubber.

In the guide rubber, there are generated such problems as abrasion and breakage of guide side face to be caused due to the contact between the drive wheel of the machine body and the rolling wheel. On the other hand, in the inner peripheral rubber, there are generated such problems as a cut scratch to be caused due to biting of a stone or the like between the inner peripheral rubber and the rolling wheel and abrasion on the rolling wheel passing surface. As countermeasures against such problems, a rubber composition of a high loss type having a relatively large loss factor (tan δ) as described in PTL 1, which is excellent in abrasion resistance and resistance to scratches (cut resistance), was frequently used. In addition, there was a case where the guide rubber and the inner peripheral rubber are formed of the same rubber composition. The loss factor (tan δ) is also called "loss tangent".

In the case where the alignment of a suspension system of the machine body is deviated or other case, the drive wheel of the machine body and the rolling wheel come into contact with the guide rubber, and the guide rubber generates heat due to friction and deformation by the contact. In the case of using a guide rubber having a large loss factor, there is a case where the guide rubber reaches a high temperature close to 100° C., and there is a case where the thermal degradation of the guide rubber or inner peripheral rubber is promoted due to such heat generation, so that the life as the rubber crawler is conspicuously impaired.

In addition, since a rubber having a large loss factor is also high in a coefficient of friction, its abrasion energy becomes large even at the same input as compared with a rubber having a low coefficient of friction, and there is a tendency that the abrasion of the guide rubber is promoted.

Furthermore, there is a possibility that the aforementioned heat generation of the guide rubber further promotes the abrasion and breakage of the guide rubber.

On the other hand, when the resistance to scratches of the inner peripheral rubber is worsened, the life of the rubber crawler is impaired, and therefore, it is required to select a rubber having a large loss factor for the inner peripheral rubber. In order to obtain a large loss factor, a styrene-butadiene rubber (SBR) is frequently used as the rubber component. However, a rubber composition containing a large amount of SBR as the rubber component is inferior in crosslinking adhesiveness (preferably vulcanization adhesiveness) between unreacted rubber compositions to each other.

On the basis of the aforementioned investigations, the present inventors intended to use a rubber having a relatively low loss factor as the guide rubber as well as a rubber having a relatively high loss factor as the inner peripheral rubber and further found that by appropriately regulating a composition of the rubber composition for forming each of the guide rubber and the inner peripheral rubber, the adhesiveness between the guide rubber and the inner peripheral rubber is improved, leading to accomplishment of the present invention.

Though a detailed mechanism from which the effects of the present invention are obtained is not elucidated yet, a part thereof may be considered as follows. That is, it may be assumed that by specifying the rubber component which each of the guide rubber composition and the inner peripheral rubber composition contains, not only a loss factor (tan δ) of each of the rubber compositions can be allowed to fall within a suitable range, but also the adhesiveness is improved. Furthermore, it may be assumed that when the guide rubber composition contains, in addition to the aforementioned rubber component, a specified carbon black, the adhesiveness is more improved.

The present invention is hereunder described in more detail.

[Guide Rubber Composition]

The rubber crawler of the present invention includes a guide rubber obtained by crosslinking a guide rubber composition; the guide rubber composition contains a rubber component (A) and a carbon black (B), the rubber component (A) contains a butadiene rubber and at least one selected from a natural rubber and isoprene rubber, and contains 50 to 80% by mass in total of the natural rubber and the isoprene rubber and 20 to 50% by mass of the butadiene rubber; the carbon black (B) contains a carbon black (B-1) having a nitrogen adsorption specific surface area ($N_2SA$) of 60 to 125 $m^2/g$ and a dibutyl phthalate (DBP) absorption of less than 130 mL/100 g and a carbon black (B-2) having a nitrogen adsorption specific surface area ($N_2SA$) of less than 60 $m^2/g$ and a dibutyl phthalate (DBP) absorption of 110 mL/100 g or more; and the total content of the carbon black (B-1) and the carbon black (B-2) is 25 to 65 parts by mass based on 100 parts by mass of the rubber component (A).

The guide rubber composition contains at least the rubber component (A) and the carbon black (B) and may further contain other component as mentioned later.

<Rubber Component (A)>

The guide rubber composition contains, as the rubber component (A), a butadiene rubber and at least one selected from a natural rubber and an isoprene rubber, the rubber component (A) containing 50 to 80% by mass in total of a natural rubber and an isoprene rubber and 20 to 50% by mass of a butadiene rubber.

Each of the natural rubber and the isoprene rubber may be used alone, or may be used in combination of two or more thereof, and there is no particular limitation.

The rubber component (A) contains the natural rubber and the isoprene rubber in an amount of preferably 55 to 75% by mass, and more preferably 55 to 70% by mass in total.

When the total content of the natural rubber and the isoprene rubber falls within the aforementioned range, a guide rubber that is excellent in resistance to scratches and manufacturing workability is obtained, and hence, such is preferred.

In addition, the rubber component (A) contains the butadiene rubber in an amount of 20 to 50% by mass, preferably 25 to 45% by mass, and more preferably 30 to 45% by mass.

When the content of the butadiene rubber falls within the aforementioned range, a guide rubber that is excellent in resistance to scratches and manufacturing workability is obtained, and hence, such is preferred.

From the viewpoint of obtaining a guide rubber of making the loss factor low and having excellent resistance to scratches, the butadiene rubber is preferably a high-cis butadiene rubber. The high-cis butadiene rubber as referred to herein means a high-cis butadiene rubber having a content of a cis-1,4-bond in a 1,3-butadiene unit of 90% or more and 99% or less, as measured by FT-IR. The content of the cis-1,4-bond in the 1,3-butadiene unit of the high-cis butadiene rubber is preferably 95% or more and 99% or less. The high-cis butadiene rubber is not particularly limited with respect to a production method thereof, and it may be produced by a known method. Examples thereof include a method of polymerizing butadiene using a neodymium-based catalyst. The high-cis butadiene rubber is commercially available, and examples thereof include "BR01" and "T700", all of which are manufactured by JSR Corporation; "UBEPOL BR150L", manufactured by Ube Industries, Ltd.; and the like.

The guide rubber composition may contain, as the rubber component (A), other rubber component than the natural rubber, the isoprene rubber, and the butadiene rubber. The content of the other rubber component is preferably 20% by mass or less, more preferably 10% by mass or less, and still more preferably 5% by mass or less in the rubber component (A), and it is especially preferred that such other rubber component is not contained.

Examples of the other rubber component include a styrene-butadiene rubber, an ethylene-propylene rubber, an ethylene-propylene-diene rubber, a butyl rubber, a halogenated butyl rubber, a chloroprene rubber, and the like. These may be used alone, or may be used in combination of two or more thereof.

<Carbon Black (B)>

The guide rubber composition contains the carbon black (B). The carbon black (B) contains a carbon black (B-1) having a nitrogen adsorption specific surface area ($N_2SA$) of 60 to 125 $m^2/g$ and a dibutyl phthalate (DBP) absorption of less than 130 mL/100 g and a carbon black (B-2) having a nitrogen adsorption specific surface area ($N_2SA$) of less than 60 $m^2/g$ and a dibutyl phthalate (DBP) absorption of 110 mL/100 g or more. The total content of the carbon black (B-1) and the carbon black (B-2) is 25 to 65 parts by mass based on 100 parts by mass of the rubber component (A)

The total content of the carbon black (B-1) and the carbon black (B-2) is 25 to 65 parts by mass based on 100 parts by mass of the rubber component (A). When the total content of the carbon black (B-1) and the carbon black (B-2) is less than 25 parts by mass based on 100 parts by mass of the rubber component (A), it is difficult to obtain the durability that is considered to be necessary for the rubber crawler; whereas when it is more than 65 parts by mass, it is difficult to obtain a preferred loss tangent (tan δ), and the dispersibility in the guide rubber composition in kneading is worsened, so that there is a case where the workability is impaired.

The total content of the carbon black (B-1) and the carbon black (B-2) is preferably 30 parts by mass or more, and more preferably 35 parts by mass or more based on 100 parts by mass of the rubber component (A), and is preferably 60 parts by mass or less, and more preferably 50 parts by mass or less.

When the total content of the carbon black (B-1) and the carbon black (B-2) falls within the aforementioned range, the durability is more excellent, a more suitable loss tangent (tan δ) is obtained, and moreover, the dispersibility of the carbon black (B-1) and the carbon black (B-2) in the guide rubber composition is more excellent, and hence, such is preferred.

In the present invention, the guide rubber composition contains, as the carbon black (B), the carbon black (B-1) and the carbon black (B-2). Though the carbon black (B-1) has a large nitrogen adsorption specific surface area and is excellent in reinforcing properties, there is a tendency that it increases the viscosity of the guide rubber composition, whereby the adhesiveness is worsened. Then, by using the carbon black (B-1) in combination with the carbon black (B-2), compatibility between the abrasion resistance and the adhesiveness to the inner peripheral rubber is achieved.

From the viewpoint of abrasion resistance, in the carbon black (B-1), it is preferred that the $N_2SA$ is 60 to 125 $m^2/g$, and the DBP absorption is 60 mL/100 g or more and less than 130 mL/100 g, and it is more preferred that the $N_2SA$ is 70 to 115 $m^2/g$, and the DBP absorption is 90 to 120 mL/100 g.

In addition, from the viewpoint of adhesiveness, in the carbon black (B-2), it is preferred that the $N_2SA$ is 25 $m^2/g$ or more and less than 60 $m^2/g$, and the DBP absorption is 110 to 140 mL/100 g, and it is more preferred that the $N_2SA$ is 30 to 50 $m^2/g$, and the DBP absorption is 115 to 130 mL/100 g.

In the present invention, the nitrogen adsorption specific surface area ($N_2SA$) of the carbon black is a value as measured in conformity with JIS K6217-2:2001; and the dibutyl phthalate (DBP) absorption is a value as measured in conformity with JIS K6217-4:2001.

A mass ratio ((B-1)/(B-2)) of the content of the carbon black (B-1) to the content of the carbon black (B-2) is preferably 2/1 to ¼, more preferably 1/1 to ⅓, still more preferably 1/1.5 to ⅓, and yet still more preferably ½ to ⅓.

When the ((B-1)/(B-2)) (mass ratio) falls within the aforementioned range, the adhesiveness to the inner peripheral rubber is more excellent, and hence, such is preferred. In addition, a guide rubber with excellent abrasion resistance is obtained while making the loss tangent (tan δ) low, and hence, such is preferred.

The carbon black (B) may include carbon black (hereinafter, referred to as "other carbon black (B-3)" other than the carbon black (B-1) and the carbon black (B-2). The content of the other carbon black (B-3) is 50% by mass or less, preferably 30% by mass or less, more preferably 10% by mass or less, further preferably 5% by mass or less to the total of the carbon black (B), and most preferably the carbon black (B) does not contain the other carbon black (B-3).

The carbon black (B) may be a carbon black produced by any method, such as a furnace method, a channel method, an acetylene method, a thermal method, etc., and it is preferably a carbon black produced by a furnace method. Specifically, examples of the carbon black (B) include standard grades inclusive of SAF, ISAF, HAF, FEF, GPF, and SRF (all of which are a furnace for rubber), and MT carbon black (pyrolytic carbon), and the like. Of these, the aforementioned furnaces for rubber are preferred. The carbon black may be properly selected and used among these materials.

<Fatty Acid Amide (C)>

In the present invention, it is preferred that the guide rubber composition further contains, in addition to the aforementioned rubber component (A) and carbon black (B), a fatty acid amide (C).

In view of the fact that the guide rubber composition contains the fatty acid amide (C), a guide rubber that is more excellent in abrasion resistance is obtained.

As the fatty acid amide, it is preferred to use an amide of an aliphatic carboxylic acid, and it is more preferred to use an amide of an aliphatic monocarboxylic acid having 12 to 22 carbon atoms. The aforementioned aliphatic monocarboxylic acid may be either a saturated fatty acid or an unsaturated fatty acid.

Specific examples of the fatty acid amide include stearic acid amide, oleic acid amide, erucic acid amide, lauric acid amide, behenic acid amide, and the like.

The fatty acid amide (C) may be used alone, or may be used in combination of two or more thereof.

The content of the fatty acid amide (C) is preferably 0.5 to 10 parts by mass, more preferably 0.7 to 7 parts by mass, and still more preferably 1 to 6 parts by mass based on 100 parts by mass of the aforementioned rubber component (A). When the content of the fatty acid amide (C) falls within the aforementioned range, not only the abrasion resistance is excellent, but also favorable adhesiveness is obtained, and hence, such is preferred.

<Other Component>

The guide rubber composition may further contain, in addition to the aforementioned components, a conventionally used additive. Specifically, examples thereof include a plasticizer (oil), a resin (exclusive of the rubber component), a fatty acid, such as stearic acid, etc., zinc oxide, an anti-aging agent, a wax, a crosslinking agent (preferably a vulcanizing agent), a vulcanization accelerator, a vulcanization retarder (scorch retarder), silica, a silane coupling agent, a peptizing agent, an antiozonant, an antioxidant, a clay, calcium carbonate, and the like. Each of the aforementioned additives may be used alone, or may be used in combination of two or more thereof.

Examples of the plasticizer include paraffinic, naphthenic, and aromatic process oils; vegetable oils, such as a coconut oil, etc.; synthetic oils, such as an alkylbenzene oil, etc.; and the like. These may be used alone, or may be used in combination of two or more thereof. The content of the plasticizer is preferably 10 parts by mass or less based on 100 parts by mass of the rubber component (A).

Examples of the resin (exclusive of the rubber component) include a polyester polyol resin, a dicyclopentadiene resin, a rosin resin, a phenol resin, a xylene resin, an aliphatic/alicyclic C5-based petroleum resin, a C5/C9-based petroleum resin, a C9-based petroleum resin, a terpene resin, and copolymers and modified products thereof, and the like. The resin may be used alone, or may be used in combination of two or more thereof. In the case of using the resin, its content is preferably 0.5 to 20 parts by mass, and more preferably 1 to 10 parts by mass based on 100 parts by mass of the rubber component (A).

In the case of using the fatty acid, the fatty acid may be used alone, or may be used in combination of two or more thereof, and its content is preferably 0.5 to 10 parts by mass, and more preferably 1 to 5 parts by mass based on 100 parts by mass of the rubber component (A).

In the case of using zinc oxide, its content is preferably 0.5 to 10 parts by mass, and more preferably 1 to 5 parts by mass based on 100 parts by mass of the rubber component (A).

The anti-aging agent may be properly selected among known anti-aging agents, and examples thereof include N-phenyl-N'-(1,3-dimethylbutyl)-p-phenylenediamine (6C), N-phenyl-N'-isopropyl-p-phenylenediamine (3C), 2,2,4-trimethyl-1,2-dihydroquinoline polymer (RD), and the like. The anti-aging agent may be used alone, or may be used in combination of two or more thereof. In the case of using the anti-aging agent, its content is preferably 0.5 to 10 parts by mass based on 100 parts by mass of the rubber component (A).

In the case of using the wax, the wax may be used alone, or may be used in combination of two or more thereof, and its content is preferably 0.5 to 10 parts by mass, and more preferably 1 to 5 parts by mass based on 100 parts by mass of the rubber component (A).

Examples of the crosslinking agent include a sulfur-based crosslinking agent (for example, sulfur, morpholine disulfide, etc.), an organic peroxide-based crosslinking agent (for example, benzoyl peroxide, dicumyl peroxide, di-t-butyl peroxide, t-butylcumyl peroxide, methyl ethyl ketone peroxide, cumene hydroperoxide, 2,5-dimethyl-2,5-di(t-butylperoxy)hexane, etc.), an inorganic crosslinking agent, a polyamine crosslinking agent, a resin crosslinking agent, an oxime-nitrosoamine-based crosslinking agent, and the like. The crosslinking agent may be used alone, or may be used in combination of two or more thereof. Of these, a sulfur-based crosslinking agent is preferred, and sulfur is more preferred.

In the case of using sulfur, its content is preferably 0.1 to 10 parts by mass, and more preferably 1 to 5 parts by mass in terms of a sulfur content based on 100 parts by mass of the rubber component (A).

Though the vulcanization accelerator is not particularly limited, examples thereof include thiazole-based vulcanization accelerators, such as 2-mercaptobenzothiazole, dibenzothiazyl disulfide, N-cyclohexyl-2-benzothiazyl sulfenamide (CBS), etc.; guanidine-based vulcanization accelerators, such as diphenyl guanidine (DPG), etc.; thiuram-based vulcanization accelerators, such as tetraoctylthiuram disulfide, tetrabenzylthiuram disulfide, etc.; a zinc dialkyldithiophosphate; and the like. The vulcanization accelerator may be used alone, or may be used in combination of two or more thereof. In the case of using the vulcanization accelerator, its content is preferably 0.1 to 5 parts by mass, and more preferably 0.2 to 3 parts by mass based on 100 parts by mass of the rubber component (A).

Examples of the vulcanization retarder (scorch retarder) include organic acids, such as phthalic anhydride, salicylic acid, benzoic acid, etc.; nitroso compounds, such as N-nitrosodiphenylamine, etc.; N-cyclohexylthio phthalimide; and the like. These may be used alone, or may be used in combination of two or more thereof.

<Preparation of Guide Rubber Composition>

The guide rubber composition is obtained by kneading the aforementioned rubber component (A), carbon black (B), and other component inclusive of the fatty acid amide (C). The kneading method is not particularly limited, and it may be properly selected among known methods. For example, there may be adopted a method in which all of the components other than sulfur, a vulcanization accelerator, zinc oxide, and a vulcanization retarder are kneaded at 100 to 200° C. using a Banbury mixer, a Brabender mixer, a kneader, a high-shear mixer, or the like (A kneading), and sulfur, a vulcanization accelerator, zinc oxide, and a vulcanization retarder are then added (B kneading), followed by kneading at 60 to 130° C. with a kneading roll machine or the like.

[Inner Peripheral Rubber Composition]

The rubber crawler of the present invention includes an inner peripheral rubber obtained by crosslinking an inner peripheral rubber composition, and the aforementioned inner peripheral rubber composition contains a rubber component (a) and a carbon black (b), the rubber component (a) contains 60 to 100% by mass of a styrene-butadiene rubber and 0 to 40% by mass of a diene-based rubber other than the styrene-butadiene rubber, and the content of the carbon black (b) is 50 to 70 parts by mass based on 100 parts by mass of the rubber component (a).

The inner peripheral rubber composition contains at least the rubber component (a) and the carbon black (b) and may further contain other component as mentioned later.

<Rubber Component (a)>

The inner peripheral rubber composition contains, as the rubber component (a), 60 to 100% by mass of a styrene-butadiene rubber and 0 to 40% by mass of a diene-based rubber other than the styrene-butadiene rubber.

The styrene-butadiene rubber (hereinafter also referred to as "SBR") is a copolymer of styrene and butadiene. The SBR may be either emulsion-polymerized SBR (E-SBR) prepared by emulsion polymerization or solution-polymerized SBR (S-SBR) prepared by solution polymerization, and it is not particularly limited. In addition, the SBR may be used alone, or may be used in combination of two or more thereof.

The rubber component (a) contains 60 to 100% by mass of SBR. When the content of SBR is less than 60% by mass, the resistance to scratches is worsened. The content of SBR in the rubber component is preferably 65 to 95% by mass, and more preferably 70 to 90% by mass.

Examples of the diene-based rubber other than the styrene-butadiene rubber include a natural rubber, an isoprene rubber, a butadiene rubber, an acrylonitrile butadiene rubber, an ethylene-propylene rubber, an ethylene-propylene-diene rubber, a butyl rubber, a halogenated butyl rubber, a chloroprene rubber, and the like. These may be used alone, or may be used in combination of two or more thereof.

Of these, the diene-based rubber other than the styrene-butadiene rubber is preferably at least one selected from the group consisting of a natural rubber, an isoprene rubber, a butadiene rubber, and an acrylonitrile butadiene rubber, and more preferably at least one selected from the group consisting of a natural rubber, an isoprene rubber, and a butadiene rubber.

The content of the diene-based rubber other than the styrene-butadiene rubber in the rubber component (a) is 0 to 40% by mass, preferably 5 to 35% by mass, and more preferably 10 to 30% by mass.

In the case of using a butadiene rubber as the diene-based rubber other than the styrene-butadiene rubber, the butadiene rubber is preferably the aforementioned high-cis butadiene rubber.

In the present invention, the rubber component (a) is preferably SBR alone, a mixture of SBR and a natural rubber or an isoprene rubber, or a mixture of SBR and a butadiene rubber.

When the SBR alone or the mixture of SBR and a butadiene rubber is made as the styrene-butadiene rubber-containing component, the styrene content in the styrene-butadiene rubber-containing component is preferably 15% by mass or more, more preferably 18% by mass or more, and still more preferably 20% by mass or more. Though an upper limit thereof is not particularly limited, it is preferably 50% by mass or less, more preferably 40% by mass or less, and still more preferably 30% by mass or less.

For example, in the case that the rubber component (a) contains the natural rubber and SBR, SBR is made as the styrene-butadiene rubber containing component, and the styrene content in the styrene-butadiene rubber component is the same as the styrene content in SBR. In the case that the rubber component includes the natural rubber, butadiene rubber and SBR, the butadiene rubber and SBR are made as the styrene-butadiene rubber containing component, and the styrene content in the styrene-butadiene rubber component corresponds to the styrene content to the total mass of the butadiene rubber and SBR.

When the styrene content in the styrene-butadiene rubber-containing component falls within the aforementioned range, an inner peripheral rubber with more excellent abrasion resistance is obtained.

The inner peripheral rubber composition may further contain, as the rubber component (a), other rubber component exclusive of SBR and the diene-based rubber other than SBR, and the content of the other rubber component is preferably 20% by mass or less, more preferably 10% by mass or less, and still more preferably 5% by mass or less in the rubber component (a), and it is especially preferred that such other rubber component is not contained.

<Carbon Black (b)>

The inner peripheral rubber composition contains a carbon black (b). In view of the fact that the inner peripheral rubber composition contains the carbon black (b), an inner peripheral rubber with excellent durability is obtained.

The inner peripheral rubber composition contains the carbon black (b) in an amount of 50 to 70 parts by mass based on 100 parts by mass of the rubber component (a). When the inner peripheral rubber composition contains the carbon black (b) in an amount of more than 70 parts by mass, since the amount is more than the appropriate amount, there is a case where a worsening of the abrasion resistance is caused. In addition, there is a possibility that the kneading workability is worsened, and the abrasion resistance is more worsened due to poor dispersion of the carbon black. In order to obtain favorable dispersion of the carbon black while blending the carbon black (b) in an amount of more than 70 parts by mass, it is necessary to extend a kneading time or to increase the number of times of kneading, resulting in a cause for conspicuous deterioration of the workability. On the other hand, when the content of the carbon black (b) is less than 50 parts by mass, favorable resistance to scratches and abrasion resistance are not obtained.

The content of the carbon black (b) in the inner peripheral rubber composition is preferably 55 to 65 parts by mass based on 100 parts by mass of the rubber component (a).

The carbon black (b) may be a carbon black produced by any method, such as a furnace method, a channel method, an acetylene method, a thermal method, etc., and it is preferably a carbon black produced by a furnace method. Specifically, examples of the carbon black (b) include standard grades inclusive of SAF, ISAF, HAF, FEF, GPF, and SRF (all of which are a furnace for rubber), and MT carbon black (pyrolytic carbon), and the like. Of these, the aforementioned furnaces for rubber are preferred. The carbon black may be properly selected and used among these materials.

In the present invention, from the viewpoint of abrasion resistance, FEF, HAF, ISAF, or SAF is suitably used as the carbon black (b). The carbon black may be used alone or two or more thereof may be used in combination.

In the carbon black (b), it is preferred that the nitrogen adsorption specific surface area is 40 to 125 $m^2/g$, and the dibutyl phthalate absorption is 95 mL/100 g or more; it is more preferred that the nitrogen adsorption specific surface area is 60 to 125 $m^2/g$, and the dibutyl phthalate absorption is 95 to 130 mL/100 g; and it is still more preferred that the nitrogen adsorption specific surface area is 65 to 115 $m^2/g$, and the dibutyl phthalate absorption is 95 to 120 mL/100 g.

When the nitrogen adsorption specific surface area and the dibutyl phthalate absorption of the carbon black (b) fall within the aforementioned ranges, respectively, an inner peripheral rubber that is excellent in resistance of scratches and excellent in adhesiveness to the guide rubber is obtained, and hence, such is preferred.

<Other Component>

The inner peripheral rubber composition may further contain, in addition to the aforementioned components, a conventionally used additive.

The inner peripheral rubber preferably contains a resin (exclusive of the rubber component). Specifically, examples thereof include a polyester polyol resin, a dicyclopentadiene resin, a rosin resin, a phenol resin, a xylene resin, an aliphatic/alicyclic C5-based petroleum resin, a C5/C9-based petroleum resin, a C9-based petroleum resin, a terpene resin, and copolymers and modified products thereof. Among them, the rosin resin is preferable. The resin may be used alone, or may be used in combination of two or more thereof. In the case of using the resin, its content is preferably 0.5 parts by mass or more, and more preferably 1 parts by mass or more based on 100 parts by mass of the rubber component (A), and is preferably 20 parts by mass or less, and more preferably 10 parts by mass or less.

As the components other than aforementioned components, examples thereof include the components exemplified as the other component in the guide rubber composition. As for a preferred content of each of the additives, the content of the rubber component (a) may be replaced by the content of the rubber component (A).

<Preparation of Inner Peripheral Rubber Composition>

The inner peripheral rubber composition is obtained by kneading the aforementioned rubber component (a), carbon black (b), and other component. The kneading method is not particularly limited, and it may be properly selected among known methods. For example, there may be adopted a method in which all of the components other than sulfur, a vulcanization accelerator, zinc oxide, and a vulcanization retarder are kneaded at 100 to 200° C. using a Banbury mixer, a Brabender mixer, a kneader, a high-shear mixer, or the like (A kneading), and sulfur, a vulcanization accelerator, zinc oxide, and a vulcanization retarder are then added (B kneading), followed by kneading at 60 to 130° C. with a kneading roll machine or the like.

[Rubber Crawler]

The rubber crawler of the present invention includes a guide rubber obtained by crosslinking the aforementioned guide rubber composition and an inner peripheral rubber obtained by crosslinking the aforementioned inner peripheral rubber composition. The rubber crawler of the present invention may further include, in addition to the guide rubber and the inner peripheral rubber, a lug and so on without particular limitations.

FIG. 1 is a cross-sectional perspective view illustrating an embodiment of a drive section between the rubber crawler of the present invention and a drive wheel of a machine body.

In FIG. 1, a rubber crawler 1 is a coreless rubber crawler and includes an inner peripheral rubber 2 that forms the inner peripheral face and guide rubbers 3 which are provided at predetermined pitches in the peripheral direction in the center of the width direction of the inner peripheral rubber. Though a shape of the guide rubber 3 is not particularly limited, in FIG. 1, it is formed in an approximately truncated square pyramid state. The guide rubber 3 has a function to prevent run-off of a rubber crawler from a drive wheel 5 of a machine body and a rolling wheel.

The rubber crawler illustrated in FIG. 1 is a rubber crawler of a friction drive type, and a frictional force against the wheel of the machine body is a motive power of the crawler. However, the rubber crawler is not limited to this, and it may also be a rubber crawler of a positive drive type. In the case of a rubber crawler of a positive drive type, the guide rubber is also submitted for transmission of a driving force from the drive wheel of the machine body.

A steel cord 6 is embedded within the rubber crawler 1 in parallel along the peripheral direction, and for example, a three-layered reinforcing ply 7 is disposed on the outer peripheral side. In addition, convex lugs 8 acting on the road surface are formed at predetermined intervals in the peripheral direction on the outer peripheral face of the rubber crawler.

Though the production method of the rubber crawler is not particularly limited, the rubber crawler can be obtained by preparing the guide rubber composition and the inner peripheral rubber composition, respectively, molding each of the rubber compositions in an uncrosslinked state in a desired shape, disposing the guide rubber composition at a predetermined position on the inner peripheral rubber composition, and then collectively vulcanizing the rubber compositions in an uncrosslinked (preferably unvulcanized) state within a die. In the aforementioned production method, the inner peripheral rubber and the guide rubber are vulcanized and bonded.

The rubber crawler of the present invention is suitably used as running sections for agricultural machinery, construction machinery, civil engineering work machinery, transportation, and so on.

EXAMPLES

The present invention is hereunder described in more detail by reference to Examples and Comparative Examples, but it should be construed that the present invention is by no means limited to the following Examples and so on.

Examples and Comparative Examples other than Examples 5 to 7 and Comparative Example 1 are prophetic.

Examples 1 to 8 and Comparative Examples 1 to 8, and Examples A to E and Comparative Examples A to C Each of rubber compositions was prepared according to a compounding composition shown in each of the following Tables 1 and 2, and a coreless rubber crawler including a guide rubber and an inner peripheral rubber formed by vulcanizing the rubber composition was fabricated.

With respect to the resulting guide rubber, inner peripheral rubber, or rubber crawler, the following evaluations were performed.

The styrene content in Table 2 means the styrene content in the styrene-butadiene rubber-containing component. Namely, the styrene-butadiene rubber-containing component means a simple substance of SBR or a mixture of SBR and the butadiene rubber, and the styrene content in Table 2 means the styrene content of said styrene-butadiene rubber-containing component.

[Evaluations]

<Crawler Actual Running Test>

A coreless crawler having a width of 425 mm, which was fabricated using the rubber compositions of Table 1 as the guide rubber composition, and the rubber compositions in Table 2 as the inner peripheral rubber composition was installed as a rubber crawler for running of a heavy-duty tractor of a friction drive type and subjected to oval running on an unpaved road at a speed per hour of 10 to 15 km/h at a turning diameter of 11 m in a linear traveling distance of 80 m for 100 hours.

(1) Guide Side Face Abrasion Index:

After the oval running, an abrasion depth of the guide side face section as generated due to the contact with the drive wheel of the machine body were measured. Furthermore, an area ratio of the scratches to the entire guide rubber side face section is calculated by binarizing the image of the guide rubber side face section. Each of them was expressed in terms of an index while defining Comparative Example 1 as 100 and the total thereof was calculated to obtain an average. The smaller the numerical value, the more excellent the abrasion resistance is.

(2) Guide Heat Build-Up:

The running was interrupted for a short time during the oval running, and a temperature of the guide rubber was measured with a contact-type thermometer, thereby comparing the heat build-up of the guide rubber.

In the case where the heat generation of the guide rubber exceeds 70° C., the heat deterioration of the rubber composition is caused, so that the life in the crawler market is worsened.

In addition, when the heat of the guide lug rubber transfers into the inner peripheral rubber, the adhesive layer between the steel cord of the inside of the crawler and the rubber composition is caused to be deteriorated, so that the life in the crawler market is worsened.

(3) Inner Peripheral Cut Scratch Index:

After the oval running, an area ratio of scratches to the inner peripheral rubber was calculated by binarizing the image of the inner peripheral rubber, and expressed in terms of an index while defining Example B as 100. The smaller the numerical value, the more excellent the resistance to scratches is.

(4) Inner Peripheral Abrasion Index:

After the oval running, an amount of abrasion of the inner peripheral rubber was quantitated and expressed in terms of an index while defining Example B as 100. The smaller the numerical value, the more excellent the abrasion resistance is.

<Loss Factor (tan δ)>

The rubber composition was vulcanized and cured at 155° C. for 30 minutes, and a test piece of 50 mm in length×5 mm in width×2 mm in thickness was then fabricated. With respect to this test piece, its loss factor (tan δ) was measured with a viscoelastic spectrometer (automatic viscoelasticity analyzer, manufactured by Ueshima Seisakusho Co., Ltd.) in conformity with JIS K6394 (2007) under a condition of a frequency of 15 Hz, an initial strain of 15%, an amplitude of 2%, and a temperature of 23° C. The actually measured values are shown in Table 1. It is demonstrated that the higher the loss factor (tan δ), the higher the energy loss against the input is. In addition, it is demonstrated that the higher the loss factor (tan δ), the larger the heat generation of the guide rubber at the time of the crawler running is.

<Bonding to Inner Peripheral Rubber>

Each of the guide rubber compositions in Table 1 and Example A as the inner peripheral rubber composition in Table 2 were respectively subjected to sheeting in an unvulcanized state in a thickness of 3 mm and stuck to each other and molded in a thickness of 6 mm, followed by bonding by means of vulcanization and curing at 155° C. for 30 minutes.

The resultant was cut in a width of 25 mm and then peeled at a peeling rate of 50 mm/min, thereby confirming the state of the peeled face. As a result, the case where the interfacial peeling was generated at a ratio of 50% or more was defined as "C"; the case where the interfacial peeling was generated at a ratio of 25% or more and less than 50% was defined as "B"; and the case where the interfacial peeling was generated at a ratio of less than 25% was defined as "A".

As for the crawler in which the interfacial peeling is generated at a ratio of 50% or more in this test, there is a high possibility that peeling is generated at an interface between the guide rubber and the inner peripheral rubber in the actual use of crawler in the market, so that there is a high possibility that the life of crawler is conspicuously reduced.

TABLE 1

| | Guide rubber composition | | | | | | | | | | | | | | | | | | |
|---|---|---|---|---|---|---|---|---|---|---|---|---|---|---|---|---|---|---|---|
| | Comparative Example 1 | Comparative Example 2 | Comparative Example 3 | Example 1 | Example 2 | Example 3 | Comparative Example 4 | Example 4 | Comparative Example 5 | Comparative Example 6 | Comparative Example 7 | Comparative Example 8 | Example 5 | Example 6 | Example 7 | Example 8 |
| Natural rubber*1 | 15 | | | | | | | | | | | | | | | |
| Styrene-butadiene rubber*2 | 85 | | | | | | | | | | | | | | | |
| Butadiene rubber*3 | | 60 | 60 | 60 | 60 | 60 | 60 | 80 | 100 | 100 | 90 | 30 | 60 | 60 | 60 | 60 |
| Carbon black N550*4 | 68 | 40 | 40 | 40 | 40 | 40 | 40 | 20 | | | 10 | 70 | 40 | 40 | 40 | 40 |
| Carbon black N330*5 | | | 13.75 | 20.625 | 34.375 | 41.25 | 48.13 | 27.5 | 27.5 | 27.5 | 27.5 | 27.5 | 27.5 | 27.5 | 27.5 | 27.5 |
| Oleic acid amide*6 | | 40 | 6.25 | 9.375 | 15.625 | 18.75 | 21.87 | 12.5 | 12.5 | 12.5 | 12.5 | 12.5 | 12.5 | 12.5 | 12.5 | 12.5 |
| Anti-aging agent RD*7 | 0.5 | 5 | 5 | 5 | 5 | 5 | 5 | 5 | | 5 | 5 | 5 | | | | 10 |
| Anti-aging agent 6C*8 | 1.5 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Stearic acid | 3 | 2 | 2 | 2 | 2 | 2 | 2 | 2 | 2 | 2 | 2 | 2 | 2 | 2 | 2 | 2 |
| Rosin*9 | 5 | 3 | 3 | 3 | 3 | 3 | 3 | 3 | 2 | 2 | 3 | 3 | 3 | 3 | 3 | 3 |
| Process oil*10 | 10 | | | | | | | | | | | | | | | |
| Spindle oil*11 | | | | | | | | | | | | | | 1 | | |
| Sulfur | 1.5 | | | | | | | | | | | | | | | |
| Insoluble sulfur*12 (60% insolble, 10% Oil) | | 2.2 | 2.2 | 2.2 | 2.2 | 2.2 | 2.2 | 2.2 | 2.2 | 2.2 | 2.2 | 2.2 | 2.2 | 2.2 | 2.2 | 2.2 |
| N,N′-m-Phenylenedimaleimide*13 | | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Thylcitraconimide*14 | 1.9 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Vulcanization accelerators*15 others*19 | 7.1 | 0.9 | 0.9 | 0.9 | 0.9 | 0.9 | 0.9 | 0.9 | 0.9 | 0.9 | 0.9 | 0.9 | 0.9 | 0.91 | 0.9 | 0.9 |
| | 7.1 | 3.3 | 3.3 | 3.3 | 3.3 | 3.3 | 3.3 | 3.3 | 3.3 | 3.3 | 3.3 | 3.3 | 3.3 | 3.3 | 3.3 | 3.3 |
| Zinc oxide*24 | 3 | 3.5 | 3.5 | 3.5 | 3.5 | 3.5 | 3.5 | 3.5 | 3.5 | 3.5 | 3.5 | 3.5 | 3.5 | 3.5 | 3.5 | 3.5 |
| Guide side face abrasion index | 100 | 95 | 113 | 63 | 52 | 50 | 62 | 72 | 157 | 132 | 106 | 125 | 70 | 55 | 47 | 43 |
| Guide heat build-up | 105° C. | 85° C. | 55° C. | 50° C. | 60° C. | 70° C. | 90° C. | 60° C. | 95° C. | 85° C. | 75° C. | 50° C. | 50° C. | 50° C. | 50° C. | 50° C. |
| Bonding to inner peripheral rubber | C | B | A | A | A | A | B | A | C | C | B | B | A | A | A | B |
| *Inner peripheral rubber = Example A tanδ | 0.32 | 0.19 | 0.11 | 0.11 | 0.14 | 0.16 | 0.2 | 0.13 | 0.25 | 0.2 | 0.17 | 0.11 | 0.09 | 0.1 | 0.11 | 0.13 |

TABLE 2

| | Inner peripheral rubber composition | | | | | | | |
|---|---|---|---|---|---|---|---|---|
| | Example A | Example B | Example C | Example D | Comparative Example A | Example E | Comparative Example B | Comparative Example C |
| Natural rubber*1 | 20 | 40 | | | 60 | 20 | 20 | 20 |
| Styrene-butadiene rubber*2 | 80 | 60 | 100 | 80 | 40 | 80 | 80 | 80 |
| Butadiene rubber*3 | | | | 20 | | | | |
| Carbon black N330*5 | 70 | 70 | 70 | 70 | 70 | 60 | 40 | 80 |
| Anti-aging agent RD*7 | 0.3 | 0.3 | 0.3 | 0.3 | 0.3 | 0.3 | 0.3 | 0.3 |
| Anti-aging agent 6C*8 | 1 | 1 | 1 | 1 | 1 | 1 | 1 | 1 |
| Stearic acid | 2 | 2 | 2 | 2 | 2 | 2 | 2 | 2 |
| Rosin*25 | 5 | 5 | 5 | 5 | 5 | 5 | 5 | 5 |
| Process oil*10 | 10 | 10 | 10 | 10 | 10 | 10 | 10 | 10 |
| Sulfur | 2 | 2 | 2 | 2 | 2 | 2 | 2 | 2 |
| Vulcanization accelerator DPG*18 | 1 | 1 | 1 | 1 | 1 | 1 | 1 | 1 |
| Vulcanization accelerator TBBS*17 | 0.6 | 0.6 | 0.6 | 0.6 | 0.6 | 0.6 | 0.6 | 0.6 |
| Zinc oxide*24 | 3 | 3 | 3 | 3 | 3 | 3 | 3 | 3 |
| Styrene content (mass %) | 23.5 | 23.5 | 23.5 | 18.8 | 23.5 | 23.5 | 23.5 | 23.5 |
| Inner peripheral scratch index | 84 | 100 | 81 | 97 | 109 | 92 | 119 | 78 |
| Inner peripheral abrasion index | 72 | 100 | 70 | 65 | 107 | 79 | 116 | 107 |

Each of the components in Tables 1 and 2 is as follows.
*1: Natural rubber: TSR20
*2: Styrene-butadiene rubber: JSR1500, manufactured by JSR Corporation
*3: Butadiene rubber: UBEPOL BR150L, the content of the cis-1,4-bond=98%, manufactured by Ube Industries, Ltd.
*4: Carbon black N550: Carbon black, nitrogen adsorption specific surface area=34 m$^2$/g, dibutyl phthalate absorption=less than 121 mL/100 g
*5: Carbon black N330: Carbon black, nitrogen adsorption specific surface area=78 m$^2$/g, dibutyl phthalate absorption=less than 102 mL/100 g
*6: Oleic acid amide: DIAMID M309, manufactured by Nippon Kasei Chemical Co., Ltd.
*7: Anti-aging agent RD: ANTAGE RD (2,2,4-trimethyl-1,2-dihydroquinoline polymer), manufactured by Kawaguchi Chemical Industry Co., Ltd.
*8: Anti-aging agent 6C: NOCRAC 6C (N-phenyl-N'-(1,3-dimethylbutyl)-p-phenylenediamine), manufactured by Ouchi Shinko Chemical Industrial Co., Ltd.
*9: Rosin: SUBROSIN B, manufactured by Yamashita Jushi Kogyo K.K.
*10: Process oil: A/0 MIX, manufactured by Sankyo Yuka Kogyo K.K.
*11: Spindle oil: Super Oil Y22, manufactured by JXTG Nippon Oil & Energy Corporation.
*12: Insoluble sulfur: SEIMI OT, manufactured by Nippon Kanryu Industry Co., Ltd.
*13: N,N'-m-Phenylenedimaleimide: Vulnoc PM, manufactured by ChangZhou XinXing HuaDA Ming Chemical Industrial Co., Ltd.
*14: Thylcitraconimide: PERKALINK 900, manufactured by LANXESS Corporation.
*15: Vulcanization accelerators: total of DPG (*16), TBBS (*17), and MBTS (*18).
*16: Vulcanization accelerator DPG: NOCCELER D (1,3-diphenylguanidine), manufactured by Ouchi Shinko Chemical Industrial Co., Ltd.
*17: Vulcanization accelerator TBBS: SANCELER NS-G (N-(t-butyl)-2-benzothiazole sulfenamide), manufactured by Sanshin Chemical Industry Co., Ltd.
*18: Vulcanization accelerator MBTS: Nocceler DM-P, manufactured by Ouchi Shinko Chemical Industrial Co., Ltd.
*19: Others: total of Paraffin wax (*20), Microcrystalline wax (*21), Fatty acid zinc salt (*22), and Retarder (*23).
*20: Paraffin wax: 135-P, manufactured by Nippon Seiro Co., Ltd.
*21: Microcrystalline wax: OKERIN11051, manufactured by Paramelt Specialty Chemicals (Suzhou) Co. Ltd.
*22: Fatty acid zinc salt: Aktiplast T, manufactured by RHEIN CHEMIE.
*23: Retarder: Retarder CTP, manufactured by Toray Fine Chemicals Co., Ltd.
*24: Zinc oxide: GINREI SR, manufactured by Toho Zinc Co., Ltd.
*25: Rosin: HIGHROSIN S, manufactured by Airec K.K.

From the results of Comparative Examples 2 to 4 and Examples 1 to 3, it was noted that in the guide rubber composition, by jointly using a specified carbon black and further regulating the content of the carbon black to a specified range relative to the rubber component, a guide rubber in which the abrasion of the guide rubber is suppressed, the heat build-up is low, and the adhesiveness to the inner peripheral rubber is excellent is obtained. In the case where the carbon black (B-1) and the carbon black (B-2) are not jointly used as in Comparative Example 2, even when the content of the carbon black is 25 to 65 parts by mass based on 100 parts by mass of the rubber component, the heat generation of the guide was caused, and the tan δ became a relatively large value. In addition, even by jointly using the carbon black (B-1) and the carbon black (B-2), in Comparative Example 3 in which the total amount of the carbon black is less than 25 parts by mass based on 100 parts by mass of the rubber component, the guide rubber did not have sufficient abrasion resistance; and in addition, in Comparative Example 4 in which the total amount of the carbon black is more than 65 parts by mass, the heat generation of the guide was perceived, and the tan δ became a relatively large value.

Next, from the results of Examples 4 and 7 and Comparative Example 5 to 8, in the case where the guide rubber composition contains the rubber component (A) containing 50 to 80% by mass in total of the natural rubber and the isoprene rubber and 20 to 50% by mass of the butadiene rubber, it was exhibited that the abrasion resistance is excellent, and the heat generation of the guide rubber is suppressed. In Example 4 in which 80 parts by mass of the natural rubber and 20 parts by mass of the butadiene rubber are contained as the rubber component (A) and Example 7 in which 60 parts by mass of the natural rubber and 40 parts by mass of the butadiene rubber are contained as the rubber component (A), a guide rubber in which the abrasion resistance is excellent, the heat build-up is low, and the adhesiveness to the inner peripheral rubber is excellent was obtained. On the other hand, in Comparative Example 5 in which only the styrene-butadiene rubber is contained and Comparative Example 6 in which only the natural rubber is contained, the abrasion resistance was deteriorated, the heat build-up of the guide was high, and the adhesiveness to the inner peripheral rubber was deteriorated. In addition, in Comparative Example 7 in which 90 parts by mass of the natural rubber and 10 parts by mass of the butadiene rubber are contained and Comparative Example 8 in which 30 parts by mass of the natural rubber and 70 parts by mass of the butadiene rubber are contained, the deterioration of the abrasion resistance was perceived.

In comparing Examples 5 to 8, it was exhibited that by the addition of a fatty acid amide, the abrasion resistance is improved. However, in Example 8 in which 10 parts by mass of the fatty acid amide is added relative to the rubber component (A), a slight worsening of the adhesiveness was perceived.

With respect to the inner peripheral rubber composition, in comparing Examples A to D with Comparative Example A, in Examples A to D in which 60 to 100% by mass of the styrene-butadiene rubber and 0 to 40% by mass of the diene-based rubber other than the styrene-butadiene rubber are contained, it was noted that an inner peripheral rubber with excellent resistance to scratches and abrasion resistance is obtained. In Example D in which the styrene content is 18.8% by mass, the abrasion resistance was slightly worsened.

In comparing Examples A and E with Comparative Examples B and C, in Examples A and E in which the content of the carbon black is 50 to 70 parts by mass based on 100 parts by mass of the rubber component (a), the inner peripheral rubber with excellent resistance to scratched and abrasion resistance was obtained; whereas in Comparative Example B in which the content of the carbon black is less than 50 parts by mass, deteriorations of the abrasion resistance and the resistance to scratches were perceived, and in Comparative Example C in which the content of the carbon black is more than 70 parts by pass, a worsening of the abrasion resistance was perceived.

With respect to the adhesiveness, in the case of using the same composition as in Example A as the guide rubber composition (Comparative Example 1), the sufficient adhesiveness was not obtained. In consequence, it was demonstrated that even by using a rubber composition of the same kind, the adhesiveness is not always excellent.

On the other hand, in the guide rubbers of Examples 1 to 8, the favorable adhesiveness to the inner peripheral rubber (Example A) was obtained.

With respect to the guide rubber composition of Example 7, in the case of evaluating the adhesiveness using each of the inner peripheral rubber compositions of Examples B to E, the evaluation of the adhesiveness was all "A".

INDUSTRIAL APPLICABILITY

In the rubber crawler of the present invention, the guide rubber is excellent in the abrasion resistance and low in the heat build-up, and the inner peripheral rubber is excellent in the resistance to scratches and the abrasion resistance. Furthermore, it was demonstrated that the rubber crawler of the present invention is also excellent in the adhesiveness between the guide rubber and the inner peripheral rubber and has extremely excellent performances as the entire rubber crawler.

The rubber crawler of the present invention is suitably used as running sections for agricultural machinery, construction machinery, civil engineering work machinery, and so on.

REFERENCE SIGNS LIST

1: Rubber crawler
2: Inner peripheral rubber
3: Guide rubber
5: Drive wheel of machine body
6: Steel cord
7: Reinforcing ply
8: Lug

What is claimed is:

1. A rubber crawler comprising a guide rubber obtained by crosslinking a guide rubber composition and an inner peripheral rubber obtained by crosslinking an inner peripheral rubber composition,
    the guide rubber composition containing a rubber component (A) and a carbon black (B),
    the rubber component (A) containing a butadiene rubber and at least one selected from a natural rubber and isoprene rubber, and containing 50 to 80% by mass in total of the natural rubber and the isoprene rubber and 20 to 50% by mass of the butadiene rubber,
    the carbon black (B) containing a carbon black (B-1) having a nitrogen adsorption specific surface area of 60 to 125 $m^2/g$ and a dibutyl phthalate absorption of less than 130 mL/100 g, and a carbon black (B-2) having a nitrogen adsorption specific surface area of less than 60 $m^2/g$ and a dibutyl phthalate absorption of 110 mL/100 g or more, and
    a total content of the carbon black (B-1) and the carbon black (B-2) is 25 to 65 parts by mass based on 100 parts by mass of the rubber component (A);
    the inner peripheral rubber composition containing a rubber component (a) and a carbon black (b),
    the rubber component (a) containing 60 to 100% by mass of a styrene-butadiene rubber and 0 to 40% by mass of a diene-based rubber other than the styrene-butadiene rubber, and
    a content of the carbon black (b) is 50 to 70 parts by mass based on 100 parts by mass of the rubber component (a).

2. The rubber crawler according to claim 1, wherein a mass ratio ((B-1)/(B-2)) of the content of the carbon black (B-1) to the content of the carbon black (B-2) is from 2/1 to ¼.

3. The rubber crawler according to claim 1, which is a coreless rubber crawler.

4. The rubber crawler according to claim 1, which is of a friction drive type rubber crawler.

5. The rubber crawler according to claim 1, wherein the rubber component (a) contains 5 to 40 mass % of the diene-based rubber other than the styrene-butadiene rubber.

6. The rubber crawler according to claim 5, wherein the diene-based rubber other than the styrene-butadiene rubber is at least one selected from the group consisting of a natural rubber, an isoprene rubber, a butadiene rubber, and an acrylonitrile butadiene rubber.

7. The rubber crawler according to claim 5, wherein a mass ratio ((B-1)/(B-2)) of the content of the carbon black (B-1) to the content of the carbon black (B-2) is from 2/1 to 1/4.

8. The rubber crawler according to claim 1, wherein the guide rubber composition further contains a fatty acid amide (C) in an amount of 0.5 to 10 parts by mass based on 100 parts by mass of the rubber component (A).

9. The rubber crawler according to claim 8, wherein a mass ratio ((B-1)/(B-2)) of the content of the carbon black (B-1) to the content of the carbon black (B-2) is from 2/1 to 1/4.

10. The rubber crawler according to claim 8, which is a coreless rubber crawler.

11. The rubber crawler according to claim 8, which is of a friction drive type rubber crawler.

12. The rubber crawler according to claim 8, wherein the rubber component (a) contains 5 to 40 mass % of the diene-based rubber other than the styrene-butadiene rubber.

13. The rubber crawler according to claim 12, wherein the diene-based rubber other than the styrene-butadiene rubber is at least one selected from the group consisting of a natural rubber, an isoprene rubber, a butadiene rubber, and an acrylonitrile butadiene rubber.

14. The rubber crawler according to claim 1, wherein the carbon black (b) is a carbon black having a nitrogen adsorption specific surface area of 40 to 125 $m^2/g$ and a dibutyl phthalate absorption of 95 mL/100 g or more.

15. The rubber crawler according to claim 14, wherein the guide rubber composition further contains a fatty acid amide (C) in an amount of 0.5 to 10 parts by mass based on 100 parts by mass of the rubber component (A).

16. The rubber crawler according to claim 14, wherein a mass ratio ((B-1)/(B-2)) of the content of the carbon black (B-1) to the content of the carbon black (B-2) is from 2/1 to 1/4.

17. The rubber crawler according to claim 14, which is a coreless rubber crawler.

18. The rubber crawler according to claim 14, which is of a friction drive type rubber crawler.

19. The rubber crawler according to claim 14, wherein the rubber component (a) contains 5 to 40 mass % of the diene-based rubber other than the styrene-butadiene rubber.

20. The rubber crawler according to claim 19, wherein the diene-based rubber other than the styrene-butadiene rubber is at least one selected from the group consisting of a natural rubber, an isoprene rubber, a butadiene rubber, and an acrylonitrile butadiene rubber.

* * * * *